(12) United States Patent
Eckert et al.

(10) Patent No.: US 10,253,929 B2
(45) Date of Patent: Apr. 9, 2019

(54) LAMP COMPRISING A DRIVER CIRCUIT BOARD AND A BASE

(71) Applicant: LEDVANCE GmbH, Garching (DE)

(72) Inventors: Klaus Eckert, Herbrechtingen (DE); Michael Rosenauer, Regensburg (DE)

(73) Assignee: LEDVANCE GMBH, Garching (DE)

( * ) Notice: Subject to any disclaimer, the term of this patent is extended or adjusted under 35 U.S.C. 154(b) by 0 days.

(21) Appl. No.: 15/534,723

(22) PCT Filed: Oct. 12, 2015

(86) PCT No.: PCT/EP2015/073515
§ 371 (c)(1),
(2) Date: Jun. 9, 2017

(87) PCT Pub. No.: WO2016/091432
PCT Pub. Date: Jun. 16, 2016

(65) Prior Publication Data
US 2017/0343163 A1    Nov. 30, 2017

(30) Foreign Application Priority Data
Dec. 10, 2014 (DE) .......................... 10 2014 225 486

(51) Int. Cl.
| | |
|---|---|
| *F21K 9/23* | (2016.01) |
| *F21K 9/90* | (2016.01) |
| *F21V 5/04* | (2006.01) |
| *F21V 7/00* | (2006.01) |
| *F21K 9/235* | (2016.01) |
| *F21K 9/238* | (2016.01) |
| *F21V 23/00* | (2015.01) |
| *F21V 23/06* | (2006.01) |

(Continued)

(52) U.S. Cl.
CPC ................ *F21K 9/235* (2016.08); *F21K 9/23* (2016.08); *F21K 9/238* (2016.08); *F21K 9/90* (2013.01); *F21V 23/006* (2013.01); *F21V 23/06* (2013.01); *F21V 5/04* (2013.01); *F21V 7/0091* (2013.01); *F21Y 2115/10* (2016.08); *H01R 12/721* (2013.01); *Y02B 20/383* (2013.01)

(58) Field of Classification Search
CPC .......... F21K 9/235; F21K 9/238; F21V 23/06; F21Y 2115/10
See application file for complete search history.

(56) References Cited

U.S. PATENT DOCUMENTS

| | | | | |
|---|---|---|---|---|
| 4,773,880 A | * | 9/1988 | Sutton ................ | H01R 13/6588 333/185 |
| 2010/0141144 A1 | | 6/2010 | Hofmann et al. | |

(Continued)

FOREIGN PATENT DOCUMENTS

| | | |
|---|---|---|
| CN | 202915112 U | 5/2013 |
| DE | 102009054519 A1 | 6/2011 |

(Continued)

*Primary Examiner* — Mary Ellen Bowman
(74) *Attorney, Agent, or Firm* — Hayes Soloway PC (57) ABSTRACT

Disclosed is a lamp (1) comprising a driver circuit board (16) and a base (2) which are electrically connected to one another by a plug connector (3, 17). The invention applies to semiconductor lamps, for example, especially LED lamps, in particular retrofit lamps, e.g. to replace conventional incandescent lamps or halogen lamps.

10 Claims, 7 Drawing Sheets

(51) Int. Cl.
*H01R 12/72* (2011.01)
*F21Y 115/10* (2016.01)

(56) References Cited

U.S. PATENT DOCUMENTS

| | | | | |
|---|---|---|---|---|
| 2011/0028015 A1* | 2/2011 | Mostoller | ............ | H01J 5/50 |
| | | | | 439/280 |
| 2012/0314422 A1* | 12/2012 | Dong | ............ | F21V 3/00 |
| | | | | 362/311.02 |
| 2013/0020941 A1* | 1/2013 | Breidenassel | ......... | F21V 23/005 |
| | | | | 315/113 |

FOREIGN PATENT DOCUMENTS

| | | | |
|---|---|---|---|
| EP | 2554893 A1 * | 2/2013 | .......... F21V 19/0045 |
| EP | 2693100 A1 | 2/2014 | |
| WO | 2015031421 A1 | 3/2015 | |

\* cited by examiner

LAMP COMPRISING A DRIVER CIRCUIT BOARD AND A BASE

The invention relates to a lamp comprising a driver circuit board and a base that are connected to one another electrically. The invention can be applied, for example, to semiconductor lamps, in particular LED lamps, in particular retrofit lamps, for instance as a replacement for conventional incandescent lamps or halogen lamps.

LED retrofit lamps comprising driver circuit board and base electrically connected thereto are known in which the electrical connection to the driver circuit board is made via wires or wired components such as a PTH protective resistor, specifically by soldering or clamping.

Figure 1:
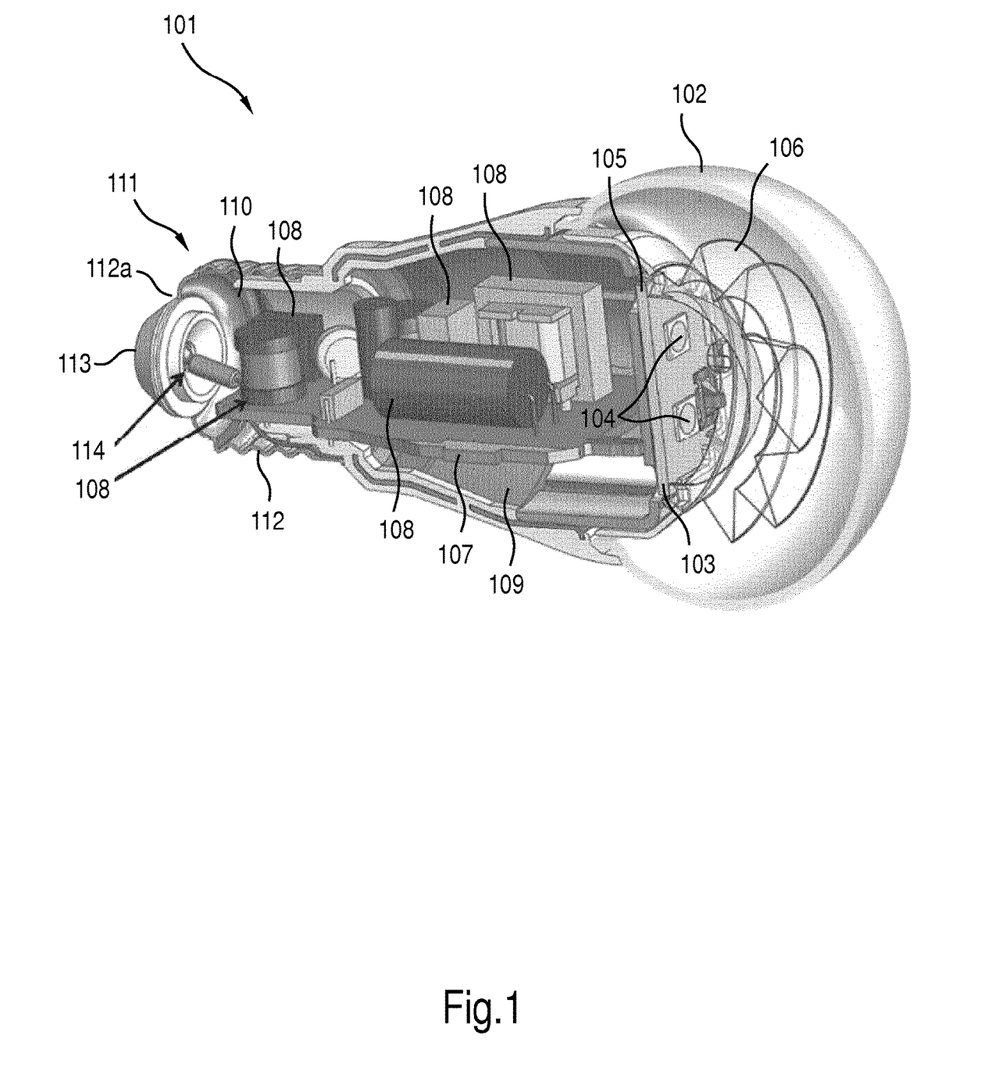
FIG. 1 shows, as already described in the introduction, a semiconductor retrofit lamp according to the prior art in an oblique sectional view.

FIG. 1 shows by way of example a semiconductor retrofit lamp 101 in the form of an LED incandescent-lamp retrofit lamp according to the prior art. The semiconductor retrofit lamp 101 has a translucent bulb 102 at the front, which provides a domed cover to an LED module 103. The LED module 103 has a plurality of LED chips 104 at the front, which are attached to a shared substrate 105 (e.g. a printed circuit board or a ceramic substrate). A beam-forming optical element 106, e.g. a complex-shaped lens, also provides a domed cover to the LED chips 104. The substrate 105 is electrically connected to a driver circuit board 107. The driver circuit board 107 is populated with electrical and/or electronic driver components 108, which together form a driver 107, 108. The driver 107, 108 is housed in a driver cavity 109 such that it is orientated in parallel with a longitudinal direction of the semiconductor retrofit lamp 101. The driver cavity 109 has a rear aperture 110, which is closed by a base 111. The base 111 comprises a side contact 112 in the form of a sleeve-like metallic screw-thread, which occupies a lateral surface running circumferentially around the side of the base 111. In an end side aperture 112a of the side contact 112 there is a central contact or bottom contact 113, which is electrically isolated from the side contact 112. The driver circuit board 107 is electrically connected to the bottom contact 113 via a PTH protective resistor 114, and to the side contact 112 via a simple wire (top figure). The semiconductor retrofit lamp 101 has the disadvantage that the electrical connection between the driver 107, 108 and the base 111 is complicated to produce and in particular is rather difficult to access for an automated system.

The object of the present invention is to overcome at least some of the disadvantages of the prior art, and in particular to provide an improved facility for the electrical connection between the base and the driver circuit board.

This object is achieved by the features of the independent claims. The dependent claims in particular contain preferred embodiments.

The object is achieved by a lamp comprising a driver circuit board and a base that are connected together electrically by a plug-in connection.

This lamp has the advantage that it is easier to produce because it dispenses with wires. It is thereby possible to increase the lamp production efficiency and to reduce the number of components needed to produce the lamp. Reliability and safety of the electrical connection are retained.

The base is used for receiving or for feeding in electrical signals ("supply signals"), e.g. a mains voltage.

The driver circuit board constitutes part of a driver electronics that comprises a plurality of electrical and/or electronic components (referred to below without loss of generality as "driver components"). The driver circuit board may be populated with all or just some of the driver components. The driver electronics is used to convert the electrical signals received at the base into signals for driving at least one light source of the lamp (referred to below without loss of generality as "drive signals"). For this purpose, it is electrically connected to the base.

The lamp has at least one light source electrically connected to the output of the driver circuit board or of the associated driver.

The at least one light source may comprise at least one semiconductor light source. In particular, the at least one semiconductor light source comprises at least one light emitting diode. In the case that there are a plurality of light emitting diodes, said light emitting diodes can produce light of the same color or of different colors. A color may be monochrome (e.g. red, blue, green, etc.) or polychrome (e.g. white). In addition, the light emitted by the at least one light emitting diode may be an infrared light (IR-LED) or an ultraviolet light (UV-LED). A plurality of diodes can produce a mixed light, e.g. a white mixed light. The at least one light emitting diode can contain at least one wavelength-converting phosphor (conversion LED). Alternatively or additionally, the phosphor can be arranged apart from the light emitting diode (remote phosphor). The at least one light emitting diode can be in the form of at least one individually housed light emitting diode or in the form of at least one LED chip. A plurality of LED chips can be mounted on a shared substrate (submount). The at least one light emitting diode can be equipped with at least one dedicated and/or shared optic for beam-guidance, e.g. at least one Fresnel lens, collimator, and so on. Instead of, or in addition to, inorganic light emitting diodes, for instance based on InGaN or AlInGaP, it is also generally possible to use organic LEDs (OLEDs, e.g. polymer OLEDs). Alternatively, the at least one semiconductor light source can comprise at least one diode laser, for instance.

A plug-in connection may be understood to mean in particular a connection composed of two connector parts that can be brought into contact on one another by means of a linear plug-in motion, and can be disconnected from one another again by a movement in the opposite direction. The plug-in connection may comprise in particular a male (connector) part, which can be inserted into at least one receptacle of a female (connector) part of the plug-in connection in order to make the plug-in connection. In this process it is possible to move the male part, the female part or both parts.

The male part may be also referred to below without loss of generality as a "plug", and the female part may also be referred to below without loss of generality as a "socket".

In a development, the male part, or plug, is fixedly connected to the driver circuit board, and the female part, or socket, is fixedly connected to the base. In another development, the socket is fixedly connected to the driver circuit board, and the plug is fixedly connected to the base. Hybrid forms are also possible. The plug and the socket can be separately produced elements that are joined to the driver circuit board or to the base, e.g. clamped therein or or soldered thereon, in order to produce the lamp.

The driver circuit board can be laterally offset with respect to the lamp axis or longitudinal axis of the lamp, in particular in order to be able to place larger components on one side of the driver circuit board as a means of allowing better utilization of space available in the driver cavity. Again in this case it is possible in particular to arrange the plug-in socket of the lamp base to be laterally offset from the center.

In an embodiment that is particularly easy to implement, a male part of the plug-in connection, i.e. the plug, is formed by at least one protrusion that protrudes from the edge of the driver circuit board (which protrusion is referred to below without loss of generality as a "plug-in protrusion"). Thus the at least one plug-in protrusion is then an integral part of the driver circuit board. It is hence possible to dispense with a separately made plug.

The at least one plug-in protrusion may be covered on one side or both sides by at least a portion of at least one conductor pattern of the driver circuit board, e.g. by a contact pad and/or by a conductor segment. Coverage on both sides can improve electrical contact with the base.

In another embodiment, a female part or socket of the plug-in connection comprises at least two contact elements, which are encapsulated in an electrically insulating potting compound such that they are separate from one another. The two contact elements can thereby be fixed in an electrically safe manner, and indeed can be fixed in a way that is easy to automate and avoids soldering. In addition, such a fixing mechanism can be implemented particularly robustly and at low cost. Alternatively, the socket may also have just one contact element.

The encapsulation (including encapsulation by injection molding) can be used to provide a socket that comprises, in particular consists of, the contact elements and the potting compound. This socket is robust and easy to handle, for instance for further assembly of the lamp.

The potting compound may be a plastics material in particular. For particularly simple and low-cost production, the contact elements can be encapsulated in the potting compound by injection molding or insert molding. The potting compound provides at least one receptacle for the plug. In the receptacle are arranged at least portions of the at least one contact element in order to be able to make electrical contact with the inserted plug.

In a development, the plug comprises a plurality of plug-in protrusions arranged adjacent to one another, and the potting compound provides corresponding receptacles or regions of a receptacle. This allows the plug to be inserted particularly securely. The receptacles or regions of a receptacle are separated from one another by the potting compound, e.g. by at least one dividing wall, to prevent a short-circuit and/or to produce sufficiently long leakage paths or air gaps. In particular, a corresponding contact element is protruding into at least one receptacle, in particular into each of the receptacles.

In another development, the contact elements are designed to connect to the plug as a clamping connection and/or piercing connection. This allows contact to be made particularly securely with the plug, e.g. with at least one plug-in protrusion of the plug.

In yet another embodiment, the female part of the plug-in connection comprises precisely two contact elements. A simple connection to a domestic mains supply can thereby be achieved. In particular for more than two contact elements, at least one contact element can be used additionally or solely for transferring information signals.

In another embodiment, at least one contact element is connected to a corresponding external connecting contact of the base. A multi-piece electrical connection can thereby also be provided between the driver circuit board and the external connecting contact. The contact element of the socket may thus be in electrical contact with a separately produced external connecting contact (element) of the socket.

A connecting contact or external connecting contact can be understood to mean in particular an electrically conductive element or component comprising an electrical contact surface, to which contact can be made from outside the lamp, e.g. in order to make electrical contact with a mating holder.

In a development, the at least one contact element extends through the potting compound, and the portion or segment of said contact element that extends outside is used as a connecting contact. An electrical connection between the driver circuit board and an external face of the base and thus also of the lamp can hence be produced as a single piece by means of the associated contact element. This can be implemented using particularly few components.

In another embodiment, the base is a screw-base, a first contact element (in particular of only two contact elements) is electrically connected to a metallic screw-thread of the base, which screw-thread acts as a first connecting contact, and a second contact (in particular of only two contact elements) extends through the potting compound as a central contact of the base, which contact acts as a second connecting contact.

The screw-base may be an Edison base. The metallic screw-thread may be a base casing part and may also be referred to as a side contact or external contact. The central contact may also be referred to as a bottom contact or end contact.

Alternatively, the side contact or external contact may be in the form of a bayonet contact of a bayonet base, for example. A contact element of the socket may make contact with the side contact as a form-fit or friction-fit.

In a development, the socket is fixedly connected to the side contact. The socket may be connected to the side contact in particular at least in a form-fit (if applicable also frictionally and/or integrally connected thereto). Some of the side contact may be encapsulated by the potting compound of the socket.

In another embodiment, the contact elements (e.g. the only two contact elements) extend out of the insulating potting compound to the outside as connecting pins. Thus the base can be used, for instance, as a pin base (e.g. as a 4-contact base or as a bi-pin base).

The contact elements can be designed as punched/bent parts for low-cost manufacture that can be automated.

In yet another embodiment, the lamp is a semiconductor retrofit lamp, in particular for replacing a conventional incandescent lamp, fluorescent tube or halogen lamp.

The following schematic description of an exemplary embodiment, which is explained in greater detail in conjunction with the drawings, will clarify and elucidate the above-described properties, features and advantages of this invention, and the manner in which they are achieved. For the sake of clarity, the same reference signs may be used in the drawings to denote identical or equivalent elements.

Figure 2:
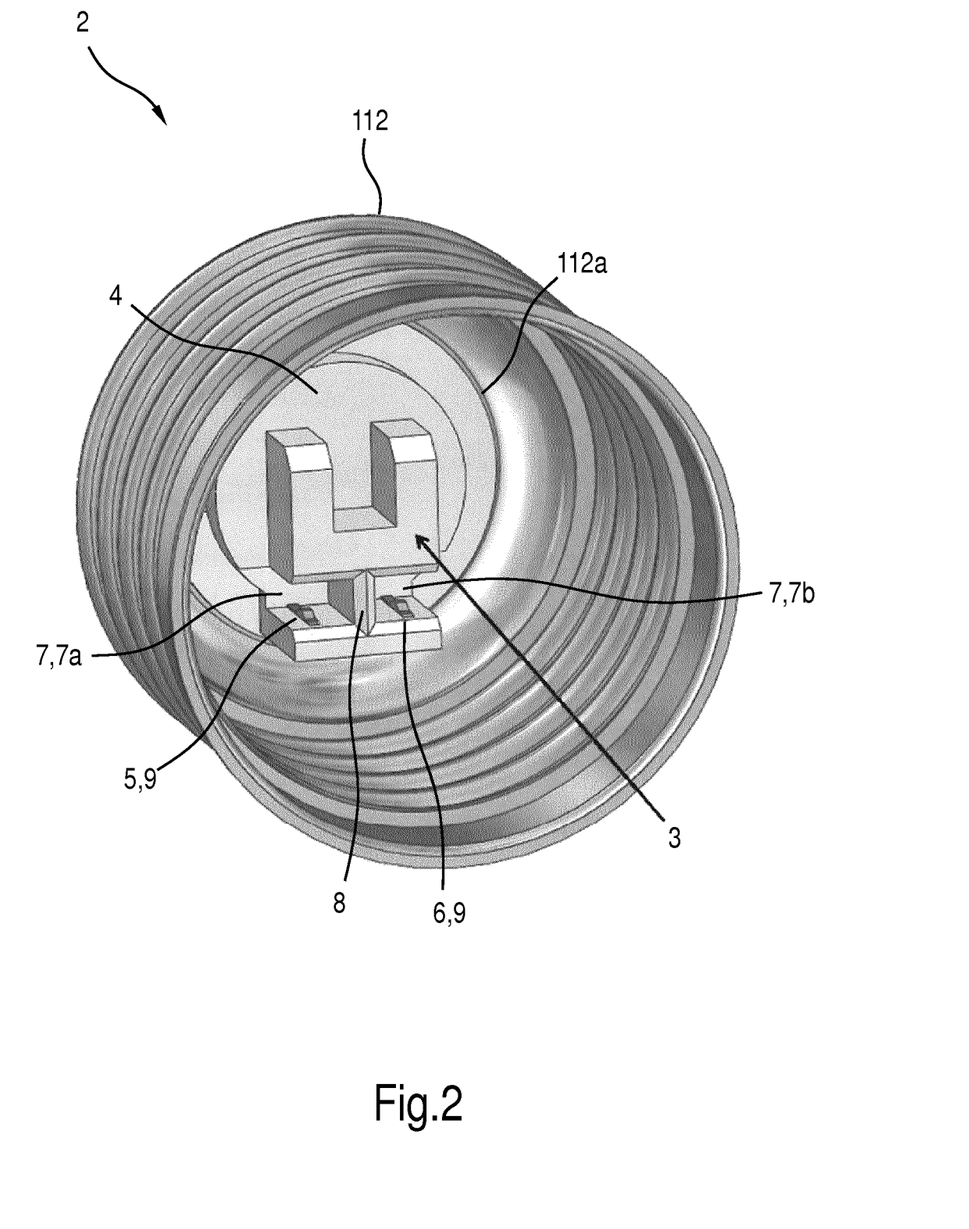
FIG. 2 shows in an oblique view from the front a base of a semiconductor retrofit lamp according to the invention.
Figure 3:
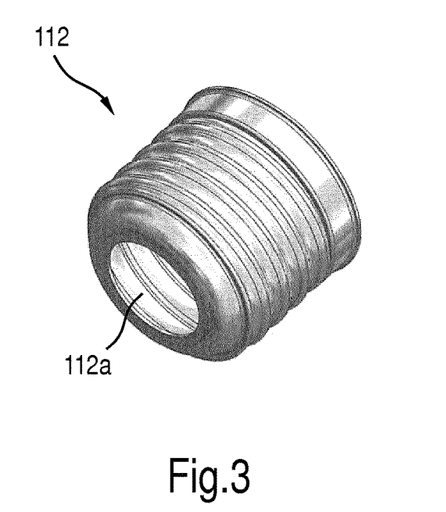
FIG. 3 shows in an oblique view from behind a side contact of the base from FIG. 2.
Figure 8:
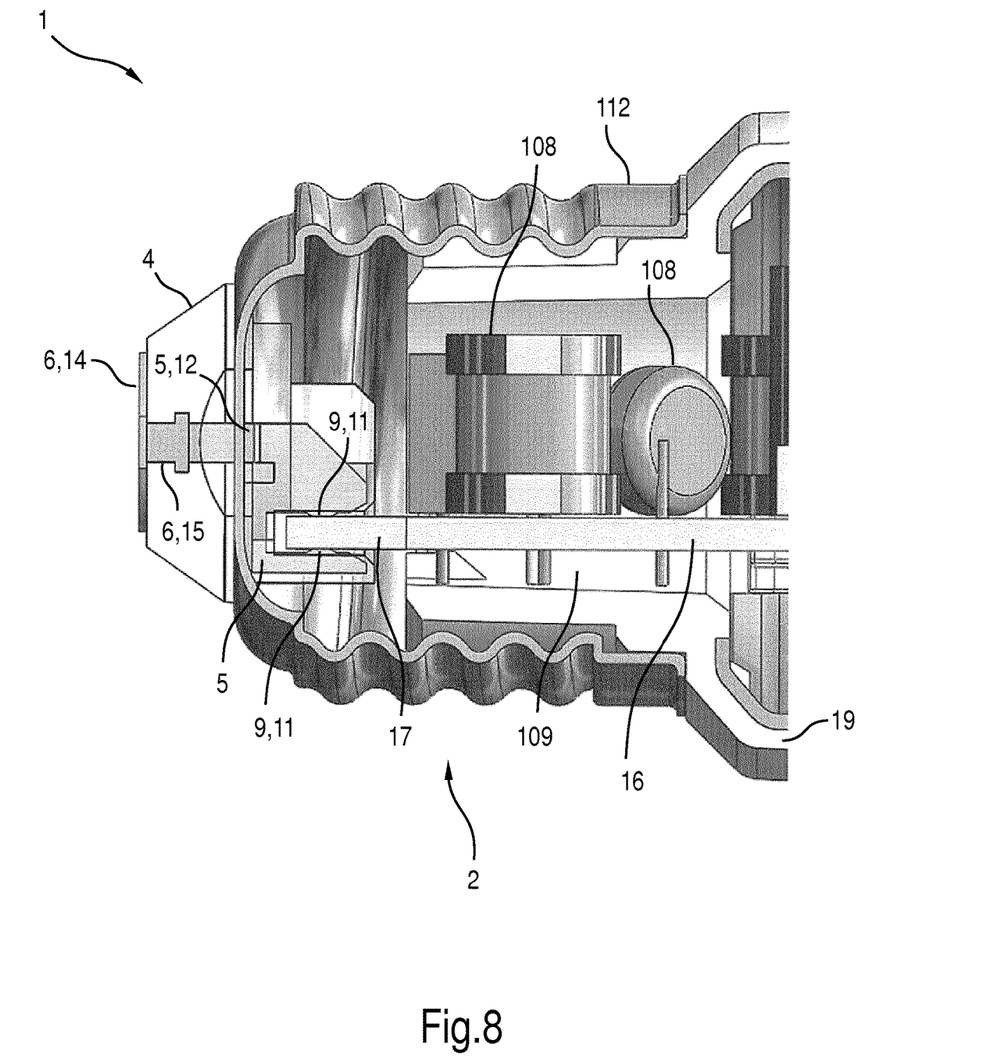
FIG. 8 shows as a sectional view from the side a cutaway of the semiconductor retrofit lamp according to the invention in the region of the base from FIG. 2.
Figure 9:
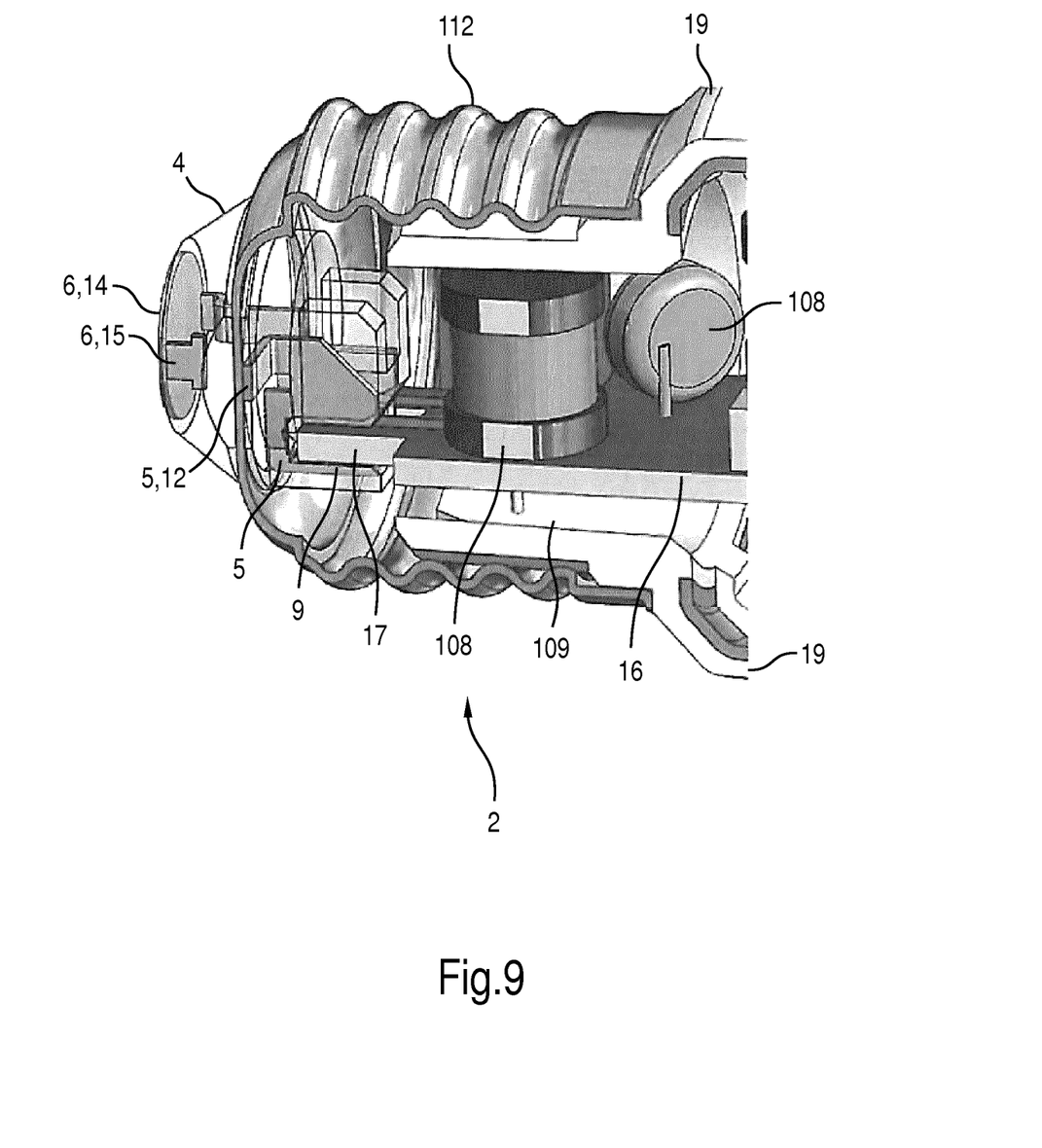
FIG. 9 shows as a sectional oblique view another cutaway of the semiconductor retrofit lamp according to the invention in the region of the base from FIG. 2.
Figure 10:
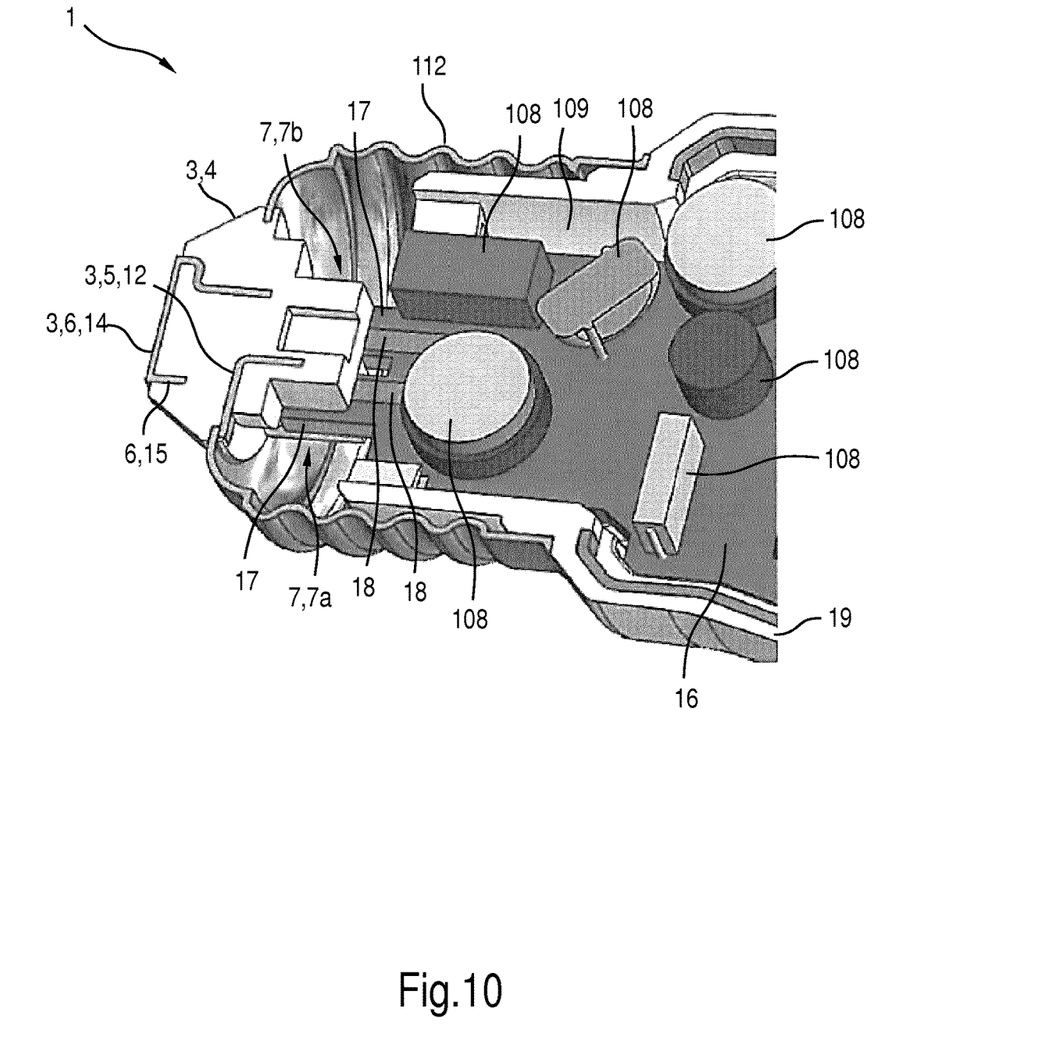
FIG. 10 shows as a sectional oblique view yet another cutaway of the semiconductor retrofit lamp according to the invention in the region of the base from FIG. 2.

FIG. 2 shows in an oblique view from the front a base 2 of a semiconductor retrofit lamp 1 according to the invention (see FIGS. 8 to 10). The base 2, which is in the form of an Edison screw-base, comprises the side contact 112, which is shown in isolation in FIG. 3. This contact may be a conventional side contact 112 and, for instance, be in the form of a sleeve-like metallic screw-thread having an end side aperture 112a.

Inserted in a form-fit into the end side aperture 112a is a socket 3 as a female part of a plug-in connection. The socket 3 consists of electrically insulating potting compound 4 made of a plastics material, in which are encapsulated in a form-fit a first contact element 5 and a second contact element 6 made of metal. The first contact element 5 and the second contact element 6 are electrically isolated from one another by the potting compound 4.

The potting compound 4 provides a receptacle 7 having a first receptacle region 7a and a second receptacle region 7b for a plug (see FIGS. 8 to 10). The two adjacent receptacle regions 7a and 7b are separated from one another by a dividing wall 8 of the potting compound 4. Contact edges 9 of the first contact element 5 and of the second contact element 6 protrude from above and below into the first receptacle region 7a and into the second receptacle region 7b respectively.

Figure 4:
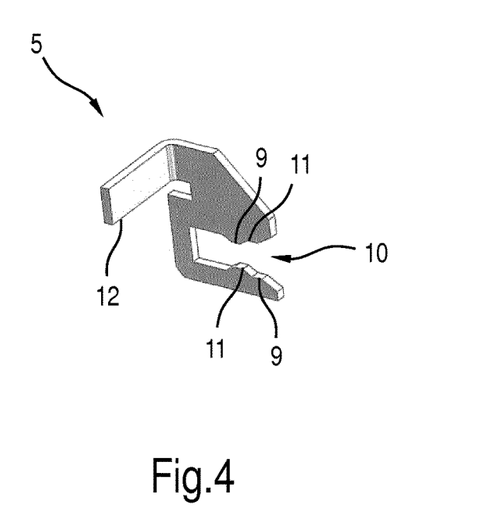
FIG. 4 shows in an oblique view from the front a first contact element of the base from FIG. 2.

FIG. 4 shows an oblique view of the first contact element 5. The first contact element 5 is made as a punched/bent part from a metal sheet (e.g. made of aluminum or copper) and comprises a jaw-shaped region 10 containing the top and bottom contact edges 9. The contact edges 9 form a mouth that widens outwards in order that a plug can be introduced securely into the jaw-shaped region 10. The jaw-shaped region 10 is open to the front with respect to the semiconductor retrofit lamp 1. Both contact edges 9 have protrusions or teeth 11 extending into the jaw-shaped region 10. The contact edges 9 can be designed to make a clamping connection and/or a piercing connection.

A rear tab-shaped portion 12 of the first contact element 5 is bent laterally and acts as a contact region to an inner face of the side contact 112.

Figure 5:
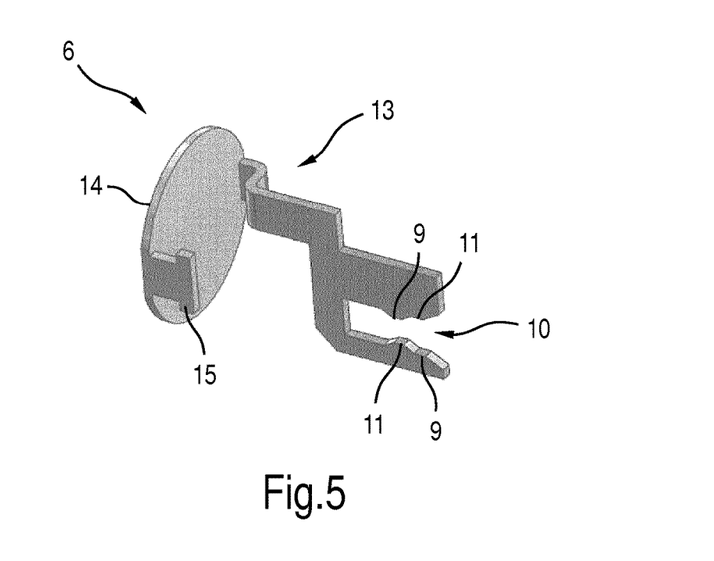
FIG. 5 shows in an oblique view from the front a second contact element of the base from FIG. 2.

FIG. 5 shows an oblique view of the second contact element 6. The second contact element 6 comprises a jaw-shaped region 10 of similar design to the first contact element 5. A rear region 13 comprises a rear contact region 14, which is bent laterally and is intended as the bottom contact. An end region 15, which is bent forwards again, is joined to the contact region 14, which end region is provided for the form-fit encapsulation in the potting compound 4 in order to prevent the rear contact region 14 from being bent back.

Figure 6:
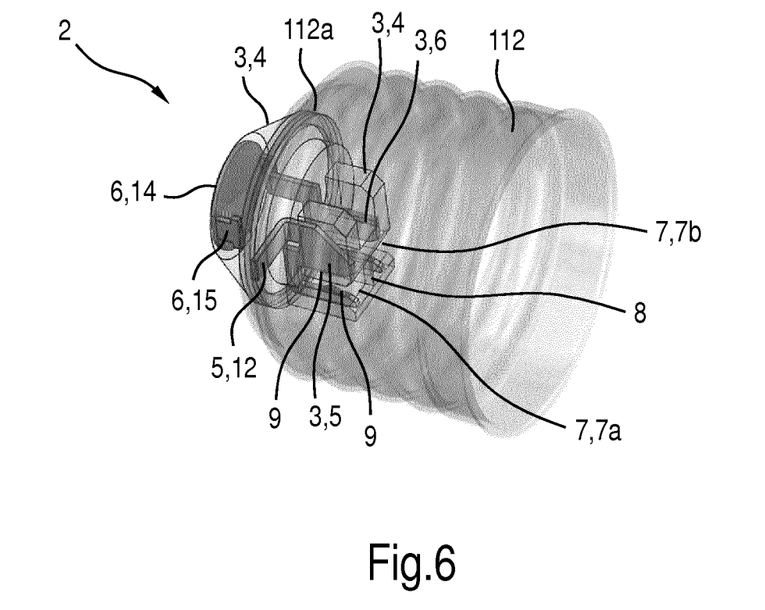
FIG. 6 shows in an oblique view from the front the base from FIG. 2, where a side contact is shown semi-transparent.

FIG. 6 shows an oblique view from the front of the base 2, where the side contact 112 and the potting compound 4 are now shown semi-transparent. The contact region 14 of the second contact element 6 acts as the bottom contact of the base 2, whereas the tab-shaped portion 12 of the first contact element 5 makes contact with the side contact 112.

Thus whereas an electrical connection between the driver circuit board 107 and a first external connecting contact (namely the side contact 112) is a two-piece connection, the electrical connection between the driver circuit board 107 and a second external connecting contact (namely the bottom contact 14) is a single-piece connection. The second contact element 6 extends through the potting compound 4 for this purpose.

The potting compound 4 encircles the edge of the end side aperture 112a of the side contact 112 from both sides and is thus arranged in a form-fit with the side contact 112.

Figure 7:
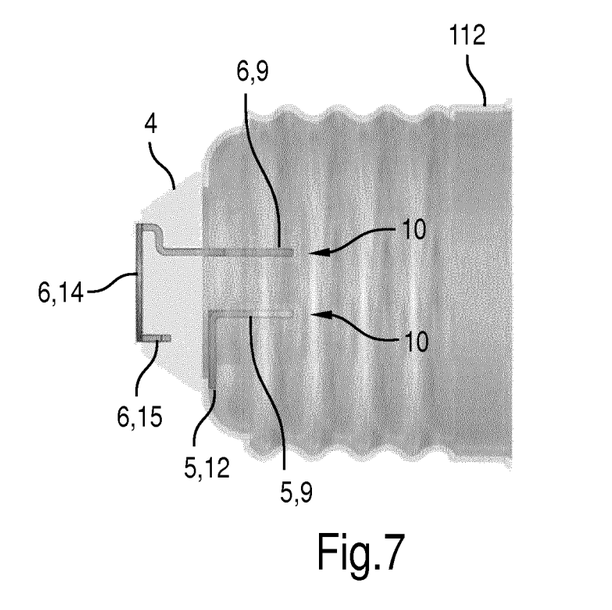
FIG. 7 shows in a side view the base from FIG. 2, where a side contact is shown semi-transparent.

FIG. 7 shows a side view of the base 2, where the side contact 112 and the potting compound 4 are shown semi-transparent. The tab-shaped portion 12 of the first contact element 5 makes contact with the side contact 112 on its inner edge region of the end side aperture 112a.

FIG. 8 shows as a sectional view from the side a cutaway of the semiconductor retrofit lamp 1 according to the invention in the region of the base 2. In this view, an associated driver circuit board 16 is shown cut-through. FIG. 9 shows as a sectional oblique view another cutaway of the semiconductor retrofit lamp 1 in the region of the base 2, but in this case with the potting compound 4 shown semi-transparent. Again in this case, the driver circuit board 16 is shown cut-through. FIG. 10 shows as a sectional oblique view yet another cutaway of the semiconductor retrofit lamp 1 in the region of the base 2, showing in this case a view onto a planar face of the driver circuit board 16.

With reference to FIGS. 8 to 10, the semiconductor retrofit lamp 1 comprises a plug-in connection between the driver circuit board 16 and the base 2, and the socket 3, respectively. The plug-in connection is implemented by a plug of the driver circuit board 16 being formed by two plug-in protrusions 17 that protrude from the edge of the driver circuit board 16. The two plug-in protrusions 17 are arranged at a lateral separation from one another such that they are plugged or inserted into the receptacle regions 7a and 7b respectively of the potting compound 4 and are separated from one another by the dividing wall 8. The two plug-in protrusions 17 both have an elongate rectangular shape and comprise a segment of a conductor 18 at least on the planar side shown in FIG. 10.

The conductors 18 of the plug-in protrusions 17 inserted into the receptacle regions 7a and 7b make contact with the teeth 11 of the corresponding contact edges 9. The teeth 11 hold the associated conductors 18 at least in a press-fit, if applicable also in a piercing connection. The insertion of the plug-in protrusions 17 into the receptacle regions 7a and 7b is achieved by a simple linear movement, and can be performed in an automated manner It is possible to dispense with using wires or the like.

In the assembled condition, the side contact 112 is plugged or pushed externally on a housing 19 of the semiconductor retrofit lamp 1, and may be fastened to the housing 19 in a friction-fit, form-fit and/or integral manner.

The semiconductor retrofit lamp 1 can in other aspects have the same design as the semiconductor retrofit lamp 101.

Although the invention has been illustrated and described in greater detail using the preferred exemplary embodiments, the invention is not limited thereto, and a person skilled in the art can derive other variations therefrom that are still covered by the scope of protection of the invention.

In general, "a" or "an" can be understood in the singular or plural sense, in particular in the sense of "at least one" or "one or more" etc., unless explicitly stated otherwise, e.g. by the expression "precisely one" etc.

In addition, where a number is specified, the stated number can include exactly that number and also a typical tolerance band unless explicitly stated otherwise.

LIST OF REFERENCES 1 semiconductor retrofit lamp
2 base
3 socket
4 potting compound
5 first contact element
6 second contact element
7 receptacle
7a first receptacle region
7b second receptacle region
8 dividing wall
9 contact edge
10 jaw-shaped region
11 tooth
12 tab-shaped portion of the first contact element
13 rear region of the second contact element
14 contact region of the second contact element
15 end region of the second contact element
16 driver circuit board
17 plug-in protrusion of the driver circuit board
18 conductor
19 housing of the semiconductor retrofit lamp
101 semiconductor retrofit lamp
102 bulb
103 LED module
104 LED chip
105 substrate
106 optical element
107 driver circuit board
108 driver component
109 driver cavity
110 rear aperture of the driver cavity
111 base
112 side contact
112a end side aperture of the side contact
113 bottom contact
114 protective resistor

The invention claimed is:

1. A lamp having a driver circuit board and an electrically conductive base that are connected together electrically by a plug-in connection, wherein a male part of the plug-in connection is formed by at least one plug-in protrusion that protrudes from an edge of the driver circuit board.

2. The lamp as claimed in claim 1, wherein a female part of the plug-in connection comprises at least two contact elements, which are encapsulated in an electrically insulating potting compound such that they are separate from one another.

3. The lamp as claimed in claim 2, wherein the at least two contact elements are designed as at least one of a clamping connection and a piercing connection.

4. The lamp as claimed in claim 2, wherein the female part of the plug-in connection consists of two contact elements, wherein each of the two contact elements forms electrical contact with the driver circuit board.

5. The lamp as claimed in claim 4, wherein at least one of the contact elements is connected to a corresponding connecting contact of the base.

6. The lamp as claimed in claim 5, wherein:
the base is a screw-base;
a first contact element is electrically connected to a metallic screw-thread of the base, which screw-thread acts as a first connecting contact; and
a second contact extends through the potting compound as a central contact of the base, which contact acts as a second connecting contact.

7. The lamp as claimed in claim 4, wherein the two contact elements extend out of the insulating potting compound to the outside as connecting pins.

8. The lamp as claimed in claim 2, wherein the at least two contact elements are punched/bent parts.

9. The lamp as claimed in claim 1, wherein the lamp is a semiconductor retrofit lamp.

10. The lamp as claimed in claim 1, wherein the male part of the plug-in connection is formed by two plug-in protrusions that protrude from the edge of the driver circuit board.

* * * * *